(12) United States Patent
Blask

(10) Patent No.: US 10,179,538 B2
(45) Date of Patent: Jan. 15, 2019

(54) RETRACTABLE ALERT SYSTEM

(71) Applicant: Mark Allan Blask, Little Falls, NY (US)

(72) Inventor: Mark Allan Blask, Little Falls, NY (US)

(*) Notice: Subject to any disclaimer, the term of this patent is extended or adjusted under 35 U.S.C. 154(b) by 0 days.

(21) Appl. No.: 15/466,908

(22) Filed: Mar. 23, 2017

(65) Prior Publication Data
US 2018/0147980 A1 May 31, 2018

Related U.S. Application Data

(60) Provisional application No. 62/426,553, filed on Nov. 27, 2016.

(51) Int. Cl.
*B60Q 1/50* (2006.01)
*B60Q 1/26* (2006.01)

(52) U.S. Cl.
CPC ............ *B60Q 1/50* (2013.01); *B60Q 1/2696* (2013.01)

(58) Field of Classification Search
CPC ............................. B60Q 1/2657; E01F 13/028
USPC .......................................................... 340/471
See application file for complete search history.

(56) References Cited

U.S. PATENT DOCUMENTS

| | | | | |
|---|---|---|---|---|
| 3,761,890 A * | 9/1973 | Fritts | ......................... | G08B 5/22 116/28 R |
| 6,213,047 B1 * | 4/2001 | Means | ................. | B60Q 1/2657 116/28 R |
| 6,682,210 B1 * | 1/2004 | Ford | ..................... | B60Q 1/2611 362/238 |
| 7,690,858 B1 * | 4/2010 | Chiavola | ............... | E01F 13/028 340/908 |
| 2011/0285549 A1 * | 11/2011 | Destro | ................. | G08G 1/0955 340/908 |
| 2014/0077021 A1 * | 3/2014 | Beemsterboer | ...... | B65H 75/425 242/398 |
| 2014/0176333 A1 * | 6/2014 | Tsuji | ..................... | G06F 1/1616 340/689 |
| 2017/0210284 A1 * | 7/2017 | Donan | ................. | B60Q 1/2692 |

* cited by examiner

*Primary Examiner* — Fabricio R Murillo Garcia
(74) *Attorney, Agent, or Firm* — Bond, Schoeneck & King PLLC; George McGuire; Erin Phillips

(57) ABSTRACT

The present invention is a retractable alert system for emergency vehicles. The alert system is a bar connected by a mechanical hinge to the rear quarter panel of a motor vehicle. When the bar is in a stowed position, it is approximately flush with the rear panel of the motor vehicle. When it is deployed, the bar rotates outwardly via the hinge approximately 90 degrees. The hinge is wired to an electrical motor powered through the car battery. The bar is deployed through actuating an interior button, which is operatively connected to the motor. The bar is further wired to the horn of the motor vehicle, such that displacement of the bar, through contact with another vehicle, causes the horn to sound. The system increases safety of emergency personnel by providing a zone around the emergency vehicle safer from oncoming traffic.

14 Claims, 5 Drawing Sheets

RETRACTABLE ALERT SYSTEM

REFERENCE TO RELATED APPLICATION

The present application relates and claims priority to U.S. Provisional Application Ser. No. 62/426,553, filed Nov. 27, 2016, the entirety of which is hereby incorporated by reference.

BACKGROUND

1. Field of Invention

The present invention relates generally to safety devices for stopped emergency vehicles, and more particularly to a retractable alert system to create an area of safety surrounding the stopped emergency vehicle.

2. Background of Art

There is a long-recognized problem frequently encountered by emergency personnel and first responders. Emergency personnel, particularly police officers, often pull motor vehicles over on the side of the road. In such situations, the shoulder on the side of the road may provide just enough space for the officer's vehicle to be completely clear from the main road. Frequently, when the officer exits his vehicle, the door crosses over into the road. Even if the door does not cross into the road, the officer may have to walk into the road after exiting the vehicle. Further, the officer may also have to cross into the road to perform duties, such as approaching the pulled-over vehicle for administering tickets or sobriety testing.

In more serious situations of a motor vehicle accident, emergency vehicles may stop and park fully or partially on the road to protect individuals involved in the accident and preserve the scene of the accident. In all of these situations, emergency personnel, such as police officers, paramedics, and fire fighters, are at risk when performing necessary tasks when there is oncoming traffic.

This problem is widespread and dangerous, such that states are passing legislation to require drivers to move to a lane farther away from stopped emergency personnel. However, out-of-state drivers and others may be unaware of the change to the local state laws. Further, it is difficult to enforce the law without additional authorities present. Therefore, physical deterrents or obstacles that impede or otherwise discourage drivers from driving in lanes or roads near parked emergency vehicles are most effective. Solutions to this problem include items such as road flares and cones that can be placed around the stopped emergency vehicle. However, these are not efficient for a simple traffic stop. Therefore, there is a need for a device that can be quickly deployed and retracted to warn drivers of parked emergency vehicles ahead.

3. Objects and Advantages

It is an object of the present invention to provide an alert system that warns drivers of parked emergency vehicles ahead.

It is another object of the present invention to provide an alert system that notifies that emergency personnel when a motor vehicle makes contact with part of the alert system.

It is yet another object of the present invention to provide an alert system that is compact and easily deployed.

Other objects and advantages of the present invention will in part be obvious and in part appear hereinafter.

SUMMARY OF THE INVENTION

In accordance with the foregoing objects and advantages, the present invention provides a retractable alert system for creating a zone of safety around an emergency vehicle. The retractable alert system comprises a bar hingedly connected to a motor vehicle. The bar is operatively connected to a motor and a battery of the motor vehicle. A button on the interior of the vehicle is operatively connected to the bar. When the button is actuated, the battery powers the motor to rotate the bar from a stowed position approximately flush against the motor vehicle to a deployed position extending outward at an angle from the motor vehicle.

In some embodiments, the bar comprises LED lights. In particular, the LED lights may be arranged in an arrow configuration pointing away from the motor vehicle when the bar is in the deployed position. Thus, the LED lights permit effective use of the retractable alert system at night and in other limited light conditions. The system may also comprise speaker on the motor vehicle which is operatively connected to the bar. The speaker emits sound when the bar is pushed beyond a hinge threshold, such as by contact with a vehicle in oncoming traffic. Thus, the bar, in the deployed position, functions as an obstacle in the road, while the alarm is an additional and/or back-up deterrent if the bar is hit by a vehicle in oncoming traffic.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
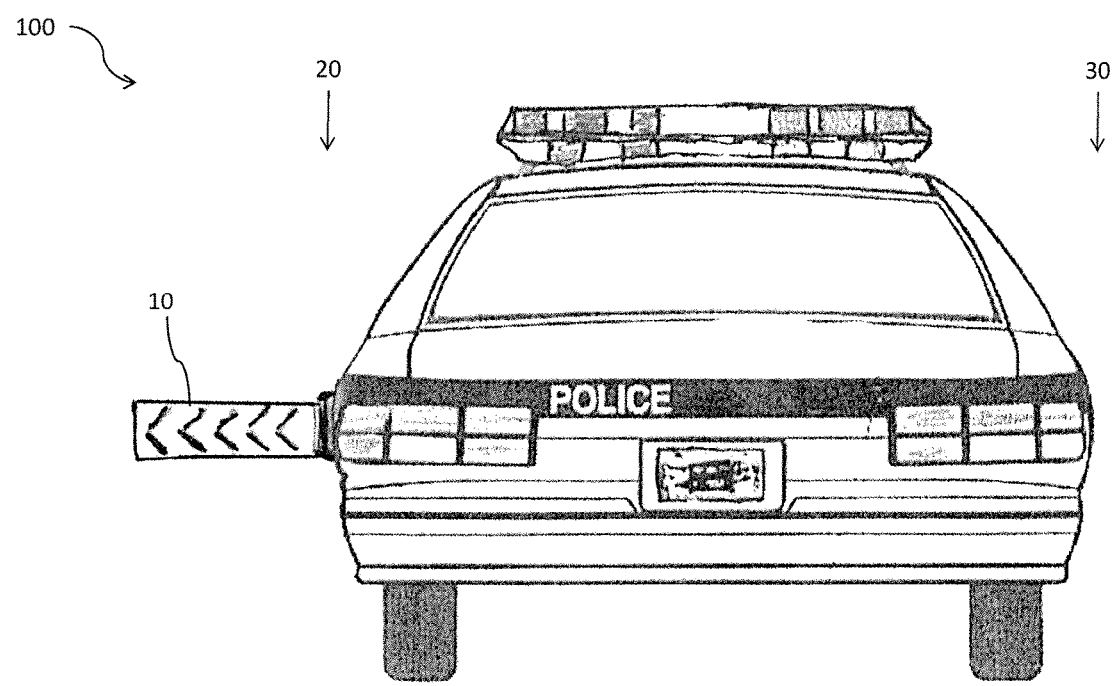
FIG. 1 is a rear view of an emergency vehicle with an illustrative embodiment of the bar of the retractable alert system in the deployed position.

Referring to the Figures, the present invention is a retractable alert system to create an area of safety surrounding the stopped emergency vehicle. Referring first to FIG. 1, there is shown a rear view of an emergency vehicle with an illustrative embodiment of the bar of the retractable alert system in the deployed position. The system is comprised of a motor vehicle 100. In the depicted embodiment, the motor vehicle 100 is an emergency vehicle, such as a police car. However, the system may comprise other emergency vehicles, such as ambulances, auto mechanic or maintenance vehicles, and fire trucks, for example. The system also comprises a retractable bar 10. In FIG. 1, the bar 10 is shown extending outwardly from the driver's side 20 of the motor vehicle 100. In an alternative embodiment, the bar 10 may extend from the passenger's side 30 of the motor vehicle 100. In yet another embodiment, the system may comprise two bars 10, one extending outwardly from the driver's side 20 and the other extending outwardly from the passenger's side 30.

In many places, motor vehicles are required to pull over to a shoulder on the right side of the road. Thus, if the bar 10 extends outwardly from the driver's side 20 of the motor vehicle 100, as shown in FIG. 1, the bar 10 may extend into the right-most lane, guiding oncoming traffic to a farther lane. The system has the same effect when employed on the passenger's side of the motor vehicle if the motor vehicle 100 was parked near the left-most lane, guiding oncoming traffic to a lane farther to the right. In both scenarios, the bar serves to warn drivers in oncoming traffic that the emergency vehicle is stopped and forces the drivers to move away from the stopped emergency vehicle towards another lane farther away. With traffic forced into another lane, emergency personnel have space to safely enter and exit the emergency vehicle, or execute other tasks around the emergency vehicles.

Figure 2:
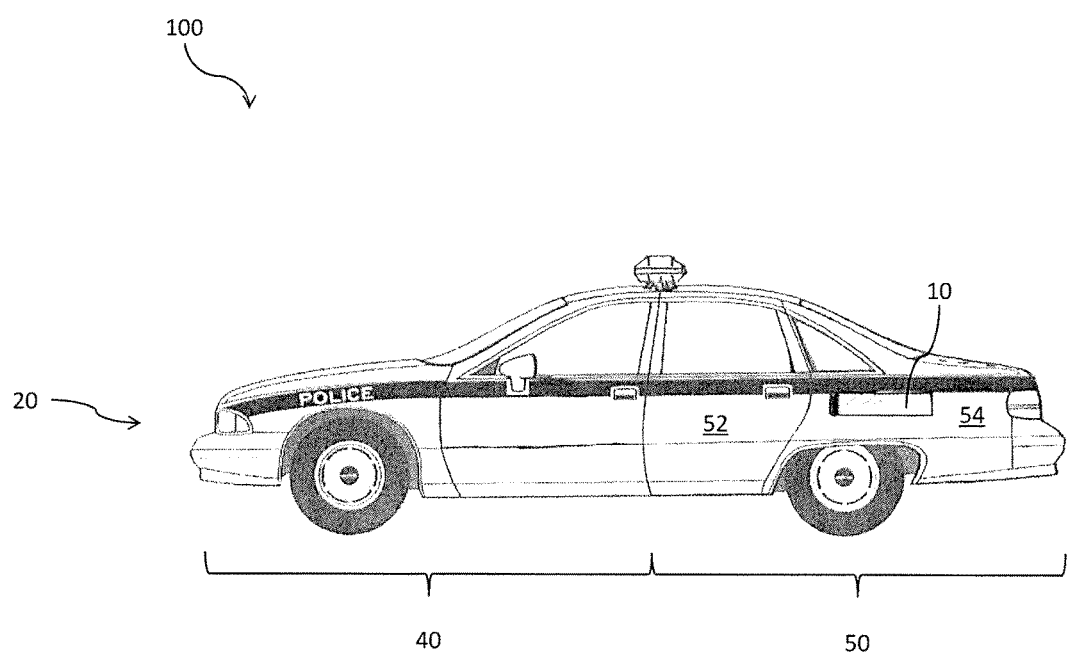
FIG. 2 is a side view of an emergency vehicle with an illustrative embodiment of the bar of the retractable alert system in the stowed position.

With reference to FIG. 2, the bar 10 of the retractable alert system on the driver's side 20 of the emergency vehicle 100 is shown in the stowed position. As described above, the bar 10 can be attached to the driver's side 20 of the emergency vehicle 100 to provide adequate space for emergency personnel to perform duties safely in the area surrounding the emergency vehicle 100. FIG. 1 shows the bar 10 extending outwardly at approximately 90 degrees from the driver's side 20 of the emergency vehicle 100. However, the bar 10 can be rotated to a stowed position where it is flush with the emergency vehicle 100, as shown in FIG. 2. In many embodiments, the bar 10 is approximately flush with the emergency vehicle 100, such that it extends up to 6 inches from the emergency vehicle 100 in the stowed position.

In the depicted embodiment, the motor vehicle 100 has a front 40 and a rear 50. The rear 50 of the motor vehicle 100 comprises a rear side door 52 and an adjacent rear side panel 54. As shown in FIG. 2, the bar 10 is flush along the rear side panel 54. Although the bar 10 is placed at other locations along the motor vehicle 100 in alternative embodiments, placement of the bar 10 at the rear side panel 54 provides drivers in oncoming traffic with the most notice to move away from the parked emergency vehicle 100. Further, in many motor vehicles 100, the rear side panel 54 offers the most space for the bar 10 when it is flush against the motor vehicle 100. Therefore, the bar 10 can have a longer length than when the bar 10 is placed at a different location along the motor vehicle 100. In one embodiment, the bar 10 is approximately 30 inches long and mounted to the rear side panel 54 of the motor vehicle 100 on the driver's side 20.

Figure 3:
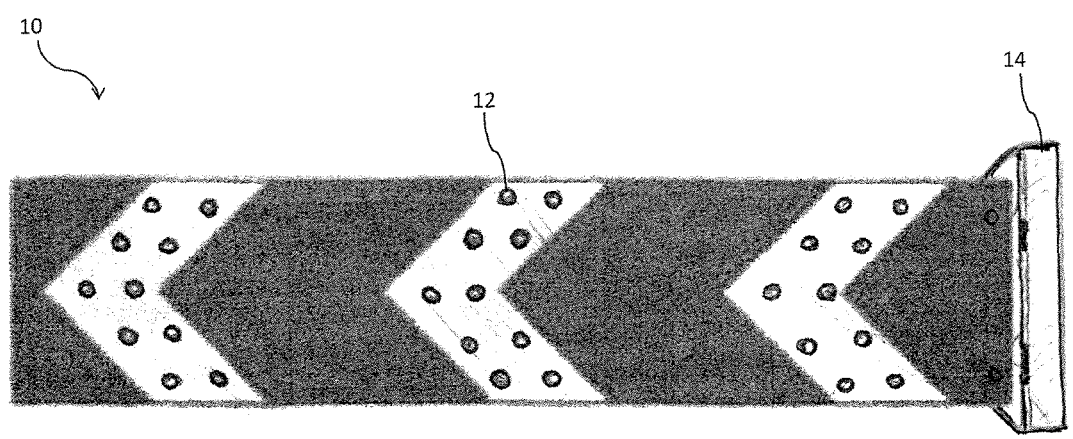
FIG. 3 is a close-up view of an illustrative embodiment of the bar of the retractable alert system.
Figure 4:
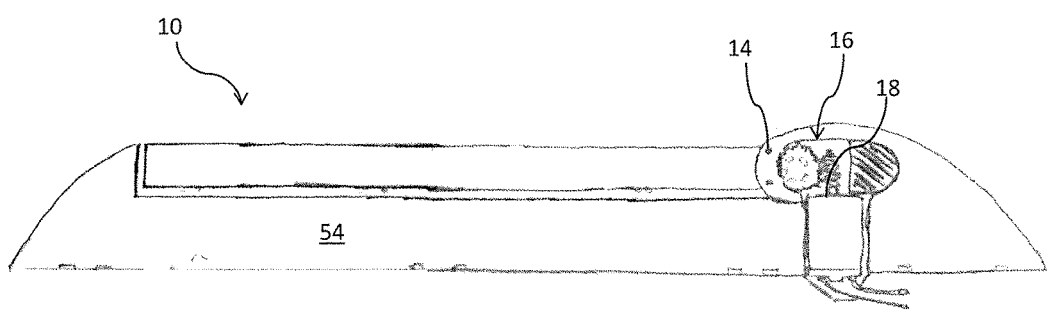
FIG. 4 is a close-up view of an illustrative embodiment of the bar, electrical motor and mechanical hinge of the retractable alert system.

The bar 10 can be fixed to the motor vehicle 100 by a hinged connection. With reference to FIGS. 3 and 4, close-up views of the bar 10 and the hinge 14 connecting the bar 10 to the motor vehicle 100 are shown. Referring briefly first to FIG. 3, a close-up view of the bar 10 is shown. The bar 10 comprises a hinge 14, which enables the bar 10 to rotate about the hinge 14 between the stowed position and the deployed position. The embodiment of the bar 10 shown in FIG. 3 has LED lights 12. More particularly, FIG. 3 shows LED lights 12 on the bar 10 in an arrow-shaped configuration. Thus, when the LED lights 12 are illuminated, they form a pointed signal directing oncoming traffic away from the stopped emergency vehicle 100. Although the LED lights 12 in FIG. 3 are shown in an arrow arrangement, other possible arrangements can be used. The LED lights 12 permit effective use of the retractable alert system at night and in other limited light conditions.

Referring to FIG. 4, the hinge 14 connecting the bar 10 to the motor vehicle 100 is shown in more detail. FIG. 4 shows a close-up view of the bar 10 having the mechanical hinge 14 connected to a motor assembly 16. The motor assembly 16 comprises an electrical motor 18, which turns gears that ultimately open and close the hinge 14, causing the bar 10 to rotate between the stowed and the deployed positions. The wiring and electrical connections of retractable alert system in FIG. 4 are discussed below and shown in FIG. 5.

Figure 5:
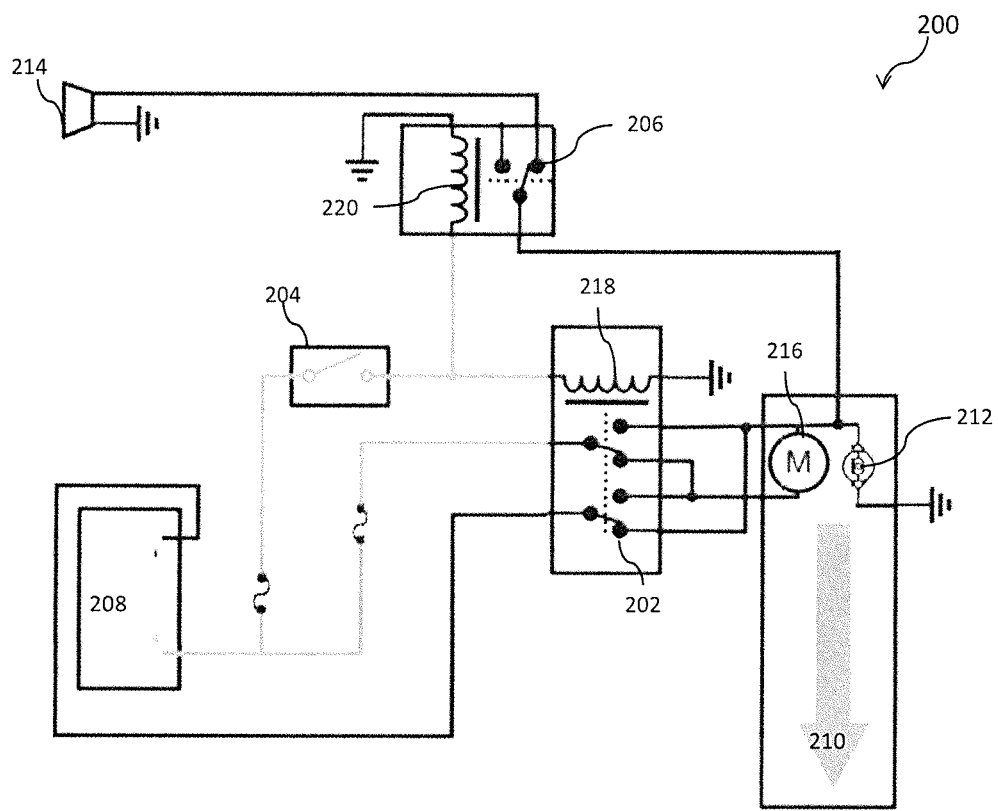
FIG. 5 is an electrical schematic of an illustrative embodiment of the retractable alert system.

Referring now to FIG. 5, an electrical schematic of an illustrative embodiment of the retractable alert system is shown. The system 200 comprises three switches 202, 204, 206. The first switch 202 connects the motor vehicle 100 battery 208 to the motor 216. In the depicted embodiment, the first switch 202 is a double post double throw (DPDT) switch connecting to both the positive and negative terminals of the battery 208. The first switch 202 thus provides power to the motor 216 from the battery 208. As further depicted in FIG. 5, the first switch 202 is also connected to a light 212 on the bar 210. Therefore, the first switch 202 provides power from the battery 208 to the motor 216, which is connected to the bar 210, and rotates the bar 210 about its hinge between a stowed position and a deployed position when the first switch 202 is triggered. The first switch 202 also supplies power from the battery 208 to the light 212 on the bar 210. The light 212 shown in FIG. 5 can be construed as a single light or multiple lights, such as the LED 12 arrangement shown in FIG. 3, for example.

In the embodiment shown in FIG. 5, the second switch 204 is a single pole single throw (SPST) switch connecting the positive terminal of the battery 208 to a first inductor 218 of the first switch 202 and a second inductor 220 of the third switch 206. The third switch 206 is a single pole double throw (SPDT) switch connected to the bar 210 and is therefore connected to the motor 216 and the light 212. When the bar 210 of the system 200 is in the deployed position and is contacted by an oncoming vehicle, the third switch 206 is triggered, consequently powering a speaker 214. In one embodiment, the speaker 214 is the car horn and when the bar 210 is moved from the deployed position beyond a hinge threshold by external force, such as contact by a motor vehicle, the third switch 206 is opened and the speaker 214 emits an alarm. The alarm notifies the emergency personnel that a vehicle has made contact with the bar 210, indicating that oncoming traffic is too close. As shown in FIG. 1, the bar 10, in the deployed position, functions as an obstacle in the road while the alarm is an additional and/or back-up deterrent if the bar 10 is hit, broken, or otherwise damaged.

In use, there is a button on the interior of the motor vehicle 100, which when actuated a first time, opens the first switch 202 to power the motor 212 to rotate the bar 210 from the stowed position to the deployed position. Also upon the first actuation of the button, the light 212 on the bar 210 will be illuminated. When the button is actuated a second time, the first switch 202 will close and the bar 210 will rotate from the deployed position to the stowed position flush or approximately flush against the motor vehicle 100. To prevent operation of the motor vehicle with the bar 210 in the deployed position, the first switch 202 may also close upon shifting the motor vehicle 200 from park into drive.

In alternative embodiments, the motor vehicle 100 may be a consumer vehicle. As the bar 10 described above serves to warn drivers in oncoming traffic that an emergency vehicle is stopped, the bar 10 in a consumer vehicle would similarly warn drivers that the driver is pulled over. Implementing the retractable alert system in consumer vehicles aids in providing a safe area around the vehicle when the driver has stopped the vehicle in situations such as changing a flat tire, running out of gas, or breaking down, for example.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A retractable alert system, comprising:
a bar hingedly connected to a motor vehicle;
wherein the bar is operatively connected to a bar motor;
a battery of the motor vehicle, remote from the bar;
wherein the battery provides power to an existing engine of the motor vehicle;
a button operatively connected to the bar, such that when the button is actuated, the battery powers the bar motor to rotate the bar from a stowed position approximately flush against the motor vehicle to a deployed position extending outward at an angle from the motor vehicle;
wherein operation of the motor vehicle is prevented when the bar is in the deployed position due to a first switch of the motor vehicle closing when shifting the motor vehicle from park to drive;
a speaker in the motor vehicle which is operatively connected to the bar;
wherein the speaker is remote from the bar and emits sound when the bar is pushed beyond a hinge threshold; and
wherein the battery provides power to the speaker when the bar is pushed beyond a hinge threshold.

2. The alert system of claim 1, wherein the bar extends at approximately a 90 degree angle from the motor vehicle in the deployed position.

3. The alert system of claim 1, wherein the bar is connected to the motor vehicle at a rear panel on a first side of the motor vehicle.

4. The alert system of claim 1, wherein the bar comprises light-emitting diode (LED) lights.

5. The alert system of claim 4, wherein the LED lights are arranged in an arrow shape pointing away from the motor vehicle when the bar is in the deployed position.

6. A retractable alert system, comprising:
a first bar hingedly connected to a motor vehicle on a first side;
a second bar hingedly connected to a motor vehicle on a second side;
wherein the first bar and the second bar are operatively connected to a bar motor;
a battery of the motor vehicle, remote from the bar;
wherein the battery provides power to an existing engine of the motor vehicle; and
a button operatively connected to the first bar and the second bar, such that when the button is actuated, the battery powers the bar motor to rotate the first bar and the second bar from a stowed position approximately flush against the motor vehicle to a deployed position extending outward at an angle from the motor vehicle;
wherein operation of the motor vehicle is prevented when the first bar and the second bar are in the deployed position due to a first switch of the motor vehicle closing when shifting the motor vehicle from park to drive;
a speaker on the motor vehicle which is operatively connected to the first bar and the second bar;
wherein the speaker is remote from the first bar and the second bar, and emits sound when at least one of the first bar or the second bar is pushed beyond a hinge threshold; and
wherein the battery provides power to the speaker when the at least one of the first bar or the second bar is pushed beyond a hinge threshold.

7. The alert system of claim 6, wherein the first bar and the second bar extend at approximately a 90 degree angle from the motor vehicle in the deployed position.

8. The alert system of claim 6, wherein the first bar is connected to the motor vehicle at a rear panel on the first side and the second bar is connected at a rear panel on the second side.

9. The alert system of claim 6, wherein the first bar and the second bar comprise comprises light-emitting diode (LED) lights.

10. The alert system of claim 9, wherein the LED lights are arranged in an arrow shape pointing away from the motor vehicle when the first bar and the second bar are in the deployed position.

11. A method for alerting drivers of stopped vehicles, comprising the steps of:
providing a first bar hingedly connected to a first side of a motor vehicle, wherein the first bar is operatively connected to a bar motor, a battery of the motor vehicle, and a speaker of the motor vehicle, wherein the battery and the speaker of the motor vehicle are remote from the first bar, and the battery provides power to an existing engine and the speaker of the motor vehicle; and a button operatively connected to the first bar; and
actuating the button, which provides power to the bar motor from the battery to rotate the first bar from a stowed position approximately flush against the motor vehicle to a deployed position extending outward at an angle from the motor vehicle;
wherein operation of the motor vehicle is prevented when the first bar is in the deployed position due to a first switch of the motor vehicle closing when shifting the motor vehicle from park to drive.

12. The method of claim 11, further comprising the step of actuating the button a second time, which provides power to the motor from the battery to rotate the first bar from the deployed position to the stowed position approximately flush against the motor vehicle.

13. The method of claim 11, further comprising the steps of:
providing a second bar hingedly connected to the motor vehicle, wherein the second bar is operatively connected to the bar motor and the battery of the motor vehicle, and a button operatively connected to the second bar; and
actuating the button, which provides power to the bar motor from the battery to rotate the bar from a stowed position approximately flush against the motor vehicle to a deployed position extending outward at an angle from the motor vehicle;
wherein operation of the motor vehicle is prevented when the second bar is in the deployed position due to a first switch of the motor vehicle closing when shifting the motor vehicle from park to drive.

14. The method of claim 13, further comprising the step of actuating the button a second time, which provides power to the motor from the battery to rotate the second bar from the deployed position to the stowed position approximately flush against the motor vehicle.

\* \* \* \* \*